US007902298B2

(12) United States Patent
Kohlstrung et al.

(10) Patent No.: US 7,902,298 B2
(45) Date of Patent: Mar. 8, 2011

(54) BONDING AGENTS AND SEALANTS BASED ON LIQUID RUBBERS

(75) Inventors: Rainer Kohlstrung, Plankstadt (DE); Klaus Rappmann, Weinheim-Rittenweier (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 143 days.

(21) Appl. No.: 12/183,644

(22) Filed: Jul. 31, 2008

(65) Prior Publication Data

US 2009/0036595 A1 Feb. 5, 2009

Related U.S. Application Data

(63) Continuation of application No. PCT/EP2007/000728, filed on Jan. 29, 2007.

(30) Foreign Application Priority Data

Apr. 6, 2006 (DE) .......................... 10 2006 016 577

(51) Int. Cl.
| *C08L 23/00* | (2006.01) |
| *C08L 23/04* | (2006.01) |
| *C08L 9/00* | (2006.01) |
| *C08L 33/02* | (2006.01) |
| *C08L 35/02* | (2006.01) |

(52) U.S. Cl. ......... 525/191; 525/216; 525/221; 525/222; 525/232; 525/240; 525/241

(58) Field of Classification Search .......... 525/191, 525/216, 221, 222, 232, 238, 240, 241
See application file for complete search history.

(56) References Cited

U.S. PATENT DOCUMENTS

| 6,361,643 | B2 * | 3/2002 | Born et al. ............... 156/307.3 |
| 2004/0265560 | A1 * | 12/2004 | Sauer et al. ............... 428/297.4 |

FOREIGN PATENT DOCUMENTS

| DE | 19502381 A1 | 8/1996 |
| EP | 0097394 A1 | 4/1984 |
| EP | 0270318 A2 | 6/1988 |
| EP | 0308664 A1 | 3/1989 |
| EP | 0338985 A2 | 10/1989 |
| EP | 0369165 A1 | 5/1990 |
| EP | 0559254 A1 | 9/1993 |
| JP | 2000313786 A | 11/2000 |
| JP | 2000319475 A | 11/2000 |
| WO | 9623040 A1 | 8/1996 |
| WO | 9903946 A1 | 1/1999 |
| WO | 0194492 A1 | 12/2001 |
| WO | 0248252 A1 | 6/2002 |
| WO | 0248255 A2 | 6/2002 |
| WO | 02070619 A1 | 9/2002 |

* cited by examiner

*Primary Examiner* — Nathan M Nutter
(74) *Attorney, Agent, or Firm* — Mary K. Cameron

(57) ABSTRACT

High-temperature-curing reactive compositions based on natural and/or synthetic elastomers containing olefinic double bonds, and on vulcanizing agents, are described, which contain at least one liquid polyene having a molecular weight between 400 and 80,000 and at least one liquid polybutadiene having a narrow molecular weight distribution and a microstructure of 10 to 20% vinyl-1,2 double bonds, 50 to 60% trans-1,4 double bonds, and 25 to 35% cis-1,4 double bonds in the molecule. These compositions furthermore contain a vulcanizing system of sulfur and accelerators and/or, if applicable, quinone oximes. These compositions are suitable for use as a single-component adhesive, sealant, or coating compound in automobile manufacture, with high tensile shear strength and high impact peel strength even, in particular, at low temperatures.

15 Claims, No Drawings

BONDING AGENTS AND SEALANTS BASED ON LIQUID RUBBERS

CROSS-REFERENCE TO RELATED APPLICATIONS

This application is a continuation under 35 USC Sections 365(c) and 120 of International Application No. PCT/EP2007/000728, filed 29 Jan. 2007 and published 25 Oct. 2007 as WO 2007/118529, which claims priority from German Application No. 102006016577.2, filed 6 Apr. 2006, each of which is incorporated herein by reference in its entirety.

FIELD OF THE INVENTION

The present invention relates to a single-component, high-temperature-curing reactive composition based on natural and/or synthetic elastomers containing olefinic double bonds and on vulcanizing agents, and to use thereof as a single-component adhesive, sealant, sealing compound, or coating compound in vehicle manufacture, in particular in automobile body manufacture.

DISCUSSION OF THE RELATED ART

In mechanical engineering and in vehicle or machine manufacture, in particular in the manufacture of aircraft, rail vehicles, or motor vehicles, constituents made of the various metallic components and/or composite materials are, to an increasing extent, being joined with the aid of adhesives. For structural adhesive joins, stringent requirements are applied to the strength of the adhesive bond. Adhesives used at present for application in automobile body manufacture, which have high strength and at the same time are tough, peel-resistant, and impact peel-resistant, are at present known chiefly on the basis of epoxies and elastomer-modified epoxies or acrylates.

For crimped-seam adhesive bonds or overlapping adhesive bonds for body manufacture, these high-temperature-curing reactive adhesives (often also formulated as hot melt adhesives) are applied onto oiled sheet metal and joined together. Curing of the adhesives or sealants used in this context takes place later in the paint drying ovens. Before that, the adhesively bonded or sealed or sealed parts pass through cleaning, phosphating, and dip-priming operations. The adhesives or sealants or sealing agents can be rinsed out of the bonding gaps by the treatment agents used in these operations. To prevent this, the adhesive, sealant, or sealing agent is precured by means of precuring mechanisms such as, for example, induction heaters, body ovens, or infrared radiators, or its rheology is appropriately adjusted so as to withstand subsequent pretreatment without being washed out. Spot welds can additionally be applied in order to stiffen the body parts. Curing of the adhesives takes place upon passage through the downstream paint ovens (for the KTL cathodic dip coating, filler, topcoat paint, etc.).

EP-A-0 308 664 discloses epoxy resin compositions that contain an epoxide adduct of a carboxyl group-containing copolymer based on butadiene-acrylonitrile or on similar butadiene copolymers, as well as a reaction product between an elastomeric prepolymer soluble or dispersible in epoxy resins and having terminal isocyanate groups, and a polyphenol or aminophenol, and subsequent reaction of said adduct with an epoxy resin. These compositions can furthermore contain one or more epoxy resins. In addition, aminofunctional hardeners, polyaminoamides, polyphenols, polycarboxylic acids and anhydrides thereof, or catalytic curing agents, and if applicable accelerators, are proposed for the curing of these compositions. It is indicated that these compositions are suitable as adhesives that, depending on the specific composition, can exhibit high strength, a high glass transition temperature, high peeling strength, high toughness, or high crack propagation resistance.

EP-A-338985 describes modified epoxy resins that contain a liquid copolymer based on butadiene, on a polar, ethylenically unsaturated comonomer, and if applicable on further ethylenically unsaturated comonomers, and further contain a reaction product derived from dihydroxy-terminated or diamino-terminated polyalkylene glycols and diisocyanates and from a monophenol, a mercapto alcohol, or an aliphatic lactam. According to the teaching of this document, these compositions can be used to flexibilize epoxy resins. In addition to the aforesaid constituents, these compositions are also said to contain epoxy resins and a hardener or accelerator. Mixtures of this kind are said to be usable as adhesives, adhesive films, patches, matrix resins, paints, or sealing compounds.

WO 01/94492 describes condensation products of cyclic carboxylic acid anhydrides of dicarboxylic acids, tricarboxylic acid anhydrides, or tetracarboxylic acid anhydrides and difunctional polyamines, in particular polyoxyalkyleneamines, as structural components for epoxy resin compositions. The condensation products based on tricarboxylic acid anhydrides or tetracarboxylic acid anhydrides are notable for, on average, more than one imide group and carboxyl group per molecule. If applicable, condensation products of tri- or polyfunctional polyols and/or tri- or polyfunctional amino-terminated polymers and cyclic carboxylic acid anhydrides can also be contained in the compositions. These compositions additionally contain usual rubber-modified epoxy resins as well as liquid and/or solid polyepoxy resins and usual hardeners and accelerators, and optionally fillers and rheology adjuvants. It is proposed to use these modified epoxy resin compositions as impact-resistant, impact peel-resistant, and peel-resistant adhesives in vehicle manufacture and in electronics, especially because they exhibit very good impact and peel properties at very low temperatures, and are said to ensure very good corrosion resistance and aging resistance for the adhesive bond.

JP 2000-313786 A describes an impact-resistant acrylic resin composition containing a (meth)acrylate polymer as component A and an elastomer-modified acrylate resin as component B. Component B is said to be present as a particulate material with an average particle size from 0.2 to 10 μm as a dispersed phase, surrounded by a continuous phase of component A. The ratio of the volume of component A to the volume of component B is said to be 0.5 to 4, and at least a portion of component A is said to be chemically bound to a portion of component B. It is indicated that these resin compositions are said to exhibit improved impact resistance, while simultaneously having good aging resistance.

In similar fashion, JP 2000-319475 A describes an impact-resistant resin composition of a (meth)acrylate copolymer component A and a modified polyurethane elastomer component B. Here the polyurethane elastomer component B is said to be present as a discontinuous dispersed phase in the continuous phase A, the dispersed phase exhibiting a structure that has a microphase separation. Here again, at least a portion of component A is said to be chemically bound to a portion of component B. It is proposed that an acrylate syrup C be polymerized on under shear, so that phase separation follows. These resin compositions are said to exhibit improved impact resistance with no degradation of aging resistance and weathering resistance.

EP 0270318 A2 describes a modified composition for use as a structural adhesive. These adhesive compositions contain a liquid rubber having olefinically unsaturated terminal groups that has been reacted with a monoisocyanate component. It is proposed, for the manufacture of these liquid elastomers, to react carboxyl-terminated polybutadiene or a polybutadiene-acrylonitrile or polybutadiene-methacrylonitrile-styrene copolymer with glycidyl methacrylate, and then to react the resulting secondary hydroxyl groups with monoisocyanate compounds. Liquid elastomers modified in this fashion having olefinic terminal groups are then mixed with olefinically unsaturated monomers selected from acrylic acid esters, acrylic acid, styrene, substituted styrene, and free-radical initiators, in order to make available a structural adhesive curable at room temperature. It is indicated that adhesive compositions of this kind exhibit improved aging resistance and improved low-temperature properties as compared with other structural adhesives based on acrylate monomers.

WO 02/070619 describes elastic (meth)acrylate adhesive compositions with high elongation at fracture. According to this document, the adhesive compositions are said to comprise at least one monofunctional (meth)acrylate monomer A whose homopolymer or copolymer exhibits a glass transition temperature between 40° C. and 140° C. The composition is also said to contain a monofunctional (meth)acrylate monomer B having the following structure:

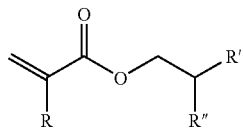

In this, R is said to be hydrogen or a methyl group, R' is hydrogen or $C_1$ to $C_3$ alkyl, in particular hydrogen or ethyl, and R" is said to be a $C_3$-$C_{20}$ alkyl group or a phenoxy group or an alkoxy group. An elastomer with a molecular weight range between 1000 and 9000 having (meth)acrylate groups is said to be present in the composition as a further component. This document indicates that the compositions disclosed therein are particularly suitable for adhesive bonding of materials having different coefficients of thermal expansion, such as those used, for example, in the vehicle industry. The adhesive bonding of side panels of trailers, or direct glass installation, are cited as examples. It is indicated that these compositions exhibit very high impact resistance at low temperatures.

Disadvantages of the aforesaid epoxy- or (meth)acrylate-based adhesives are:
high raw material costs
the need for industrial hygiene labeling (usually Xi)
limited oil absorption
insufficient corrosion protection
insufficient aging resistance.

Rubber-based high-strength adhesives have also been disclosed.

WO 96/23040 describes single-component, high-temperature-curing structural adhesives based on liquid rubbers that, if applicable, can also in part contain functional groups, solid rubbers, thermoplastic polymer powders, and sulfur, and on vulcanization accelerators. These adhesives are suitable for adhesive bonding of metal parts. Tensile shear strengths of more than 15 MPa, along with a high elongation at fraction of more than 15%, can be obtained. These adhesives are substantially free of low-molecular-weight epoxy resins and are especially suitable for use in body manufacture in the automotive industry.

WO 99/03946 discloses hot-pumpable, high-temperature-curing compounds based on ethylene-vinyl acetate (EVA) copolymers, containing at least one solid EVA copolymer having a softening point above 50° C. measured with the ring and ball method per ASTM D 28, at least one liquid reactive plasticizer having olefinically unsaturated double bonds, and at least one peroxide crosslinking agent. As indicated by this document, these compounds are suitable as sealing agents for fine and coarse seams in vehicle manufacture. With the addition of blowing agents, they can also be used as undercoating adhesives. The preferred areas of use are in body manufacture in the production of automobiles.

WO 02/48252 discloses high-temperature-curing reactive compositions based on natural and/or synthetic elastomers, based on liquid polyenes and containing olefinic double bonds, and solid rubbers if applicable. The vulcanizing system is of sulfur and/or metal oxides and one or more organic accelerators, which contain one or more heterocyclic compound(s) that have at least two nitrogen atoms in the ring. These compositions can be vulcanized by sulfur and sulfur compounds while avoiding or greatly reducing odor emissions. The document indicates that these compositions are suitable as adhesives, sealants, or coating compounds, in particular in automotive engineering.

WO 02/48255 discloses high-temperature-curing reactive compositions based on natural and/or synthetic liquid elastomers containing olefinic double bonds, and on vulcanizing agents, which in addition to conventional liquid polyenes, contain at least one liquid cis-1,4-polyisoprene having a molecular weight between 20,000 and 70,000 as well as a vulcanizing system of sulfur, accelerators, and quinone oximes. These adhesives exhibit plastisol-like flow behavior, so that they are applicable at room temperature using conventional spray equipment. It is indicated that these compositions are suitable as a seam sealing and sealing compound, as an undercoating adhesive, and as a structural adhesive, for example as a crimped seam adhesive.

The rubber-based high-strength adhesives of the existing art cited above need improvement in terms of their properties at low temperature; in particular, they do not exhibit elastic and impact-tough properties at low temperatures because (presumably as a result of the high degree of crosslinking) they become too brittle at low temperatures.

BRIEF SUMMARY OF THE INVENTION

The object of the present invention was therefore to make available high-strength and at the same time impact-tough adhesives that can be used for applications in automobile body manufacture and that do not contain epoxy resins or (meth)acrylate resins as a substantial constituent, without the use of expensive special polymers or copolymers.

The present invention makes available a single-component, high-temperature-curing reactive composition based on natural and/or synthetic elastomers containing olefinic double bonds and on vulcanizing agents that contains
a) at least one liquid polyene having a molecular weight between 400 and 80,000, by preference between 800 and 25,000;
b) at least one liquid polybutadiene having 10-20% vinyl-1,2, 50-60% trans-14, and 25-35% cis-1,4 double bonds as a microstructure; and
c) a vulcanizing system of sulfur and accelerators and/or, if applicable, quinone oximes.

"Liquid" is understood here as "liquid at room temperature (22° C.)." "Molecular weight" is understood here as "number average molecular weight ($M_n$)".

A further subject of the present invention is use of the aforesaid high-temperature-curing reactive compositions as a single-component adhesive, sealant, or coating compound or sealing compound in automobile body manufacture.

DETAILED DESCRIPTION OF CERTAIN EMBODIMENTS OF THE INVENTION

The liquid polyene(s) or elastomers a) contain at least one olefinically unsaturated double bond per molecule. They can be selected from the following group of homo- and/or copolymers:

Polybutadienes, in particular the 1,3- and 1,2-polybutadienes, polybutenes, polyisobutylenes, 1,4- and 3,4-polyisoprenes, styrene-butadiene copolymers, butadiene-acrylonitrile copolymers, such that one or more of said polymers can have terminal and/or (statistically distributed) lateral functional groups. Examples of such functional groups are hydroxy, amino, carboxyl, carboxylic acid anhydride, or epoxy groups. The molecular weight of these liquid rubbers is typically below 80,000 and above 400, by preference between 800 and 25,000. The proportion of liquid rubber in the total composition depends on the desired rheology of the uncured composition and on the desired mechanical rigidity or strength of the composite, and if applicable on the acoustic damping properties of the cured composition. The proportion of liquid rubber or elastomer normally varies between 2 and 55 wt % of the total formulation. It has proven useful in this context to use, by preference, mixtures of liquid rubbers of different molecular weights and different configurations with regard to the remaining double bonds. In addition, both block copolymers and copolymers having a statistical distribution of the comonomers can be used as copolymers. In order to achieve optimum adhesion on the various substrates, in the particularly preferred formulations a portion of a liquid rubber component having hydroxyl groups, carboxyl groups, or acid anhydride groups is used. The proportion of carboxyl group-containing liquid rubber can be 0 to 25 wt %, by preference 1 to 15, and very particularly preferably 3 to 10 wt %.

An essential constituent of the compositions according to the present invention is liquid polybutadienes, by preference having a narrow molecular weight distribution, that can be manufactured by anionic polymerization. These low-molecular-weight liquid polybutadienes contain three structure types in the polymer chain: vinyl-1,2 double bonds, cis-1,4 double bonds, and trans-1,4 double bonds, these liquid polymers comprising 10 to 20% vinyl-1,2 double bonds, 50 to 60% trans-1,4 double bonds, and 25 to 35% cis-1,4 double bonds in their microstructure. The molecular weights of these liquid butadienes are between 2,000 and 12,000, by preference between 5,000 and 9,000 (arithmetically averaged molecular weight). Because of their narrow molecular weight distribution, they have a very low viscosity of between 3 and 15 Pa·s at 25° C. They can if applicable, depending on the anionic polymerization, comprise one or two terminal or one or more statistically distributed hydroxyl group(s) per molecule. Alternatively, these polymers can also comprise one or two terminal or one or more statistically distributed carboxyl group(s). The advantage of using these liquid polybutadienes having a narrow molecular weight distribution is a higher molecular weight as compared with usual liquid polybutadienes, even though the viscosity is low.

In addition, the adhesive composition according to the present invention can also contain a portion of solid rubbers. Suitable solid rubbers have a significantly higher molecular weight as compared with the liquid rubbers (MW=100,000 or higher). Examples of suitable rubbers are polybutadiene, preferably having a very high proportion (typically over 95%) of cis-1,4 double bonds, styrene-butadiene rubber, butadiene-acrylonitrile rubber, synthetic or natural isoprene rubber, polycyclooctenamer, butyl rubber, or polyurethane rubber. The proportion of solid rubber can be up to 15 wt %; it is by preference between 0 and 12 wt %, and very particularly preferably between 0 and 9 wt %.

The single-component, high-temperature-curing reactive compositions according to the present invention further contain a vulcanizing system of sulfur and accelerators and/or, if applicable, quinone oximes.

A plurality of vulcanizing agents in combination with elemental sulfur, but also vulcanizing systems without free sulfur, are suitable for the vulcanizing system. Included among the latter are vulcanizing systems based on thiuram disulfides, organic peroxides, polyfunctional amines, quinones, p-benzoquinone dioxime, p-nitrosobenzene, and dinitrosobenzene, or also crosslinking with (blocked) diisocyanates. Vulcanizing systems based on elemental sulfur and organic vulcanization accelerators, as well as zinc compounds, are, however, very particularly preferred. The powdered sulfur is used in quantities from 4 to 25 wt % based on the total composition; particularly preferably, quantities between 5 and 15 wt % are used. Suitable organic accelerators are dithiocarbamates (in the form of their ammonium or metal salts), xanthogenates, thiuram compounds (monosulfides and disulfides), thiazole compounds, aldehyde/amine accelerators (e.g. hexamethylenetetramine), and guanidine accelerators; dibenzothiazyl sulfide (MBTS), 2-mercaptobenzothiazole (MBT), the latter's zinc salt (ZMBT), zinc dibenzyl dithiocarbamate (ZBEC), N-cyclohexylbenzodithiazyl-sulfenamide (CBS), or diphenylguanidine are very particularly preferred. The accelerators are used in quantities between 0.25 and 8.0 wt %, particularly preferably between 0.4 and 6 wt %. In order to achieve particularly good temperature and reversion resistance for the adhesive, the vulcanizing mixture can also contain bifunctional crosslinkers. Concrete examples are crosslinkers based on bifunctional dithiocarbamates such as, for example, 1,6-bis(N,N-dibenzylthiocarbamoyldithio)hexane. Crosslinkers of this kind are contained in the compositions in quantities between 0 and 2, by preference between 0 and 1 wt %.

In the context of the zinc compounds acting as accelerators, it is possible to select among the zinc salts of fatty acids, zinc dithiocarbamates, basic zinc carbonates, and in particular finely particulate zinc oxide. The zinc-compound content is in the range between 0.5 and 10 wt %, by preference between 2 and 8 wt %. In addition, further typical rubber vulcanizing adjuvants such as fatty acids (e.g. stearic acid) can be present in the formulation.

According to the present invention a combined vulcanizing system of elemental sulfur, the aforesaid organic accelerators, and quinone dioximes can be used. p-Benzoquinone dioxime may be mentioned by way of example. Other quinone dioximes could, however, also be used in combination with the aforesaid sulfur systems. The vulcanizing system can also comprise only quinone dioximes.

In addition, the compositions according to the present invention for rubber mixtures can contain the usual fillers, accelerators, crosslinking agents such as sulfur and/or peroxides, antioxidants, co-activators and further catalysts, carbon blacks, blowing agents, oils, aging protection agents, fibers optionally including graphite, rheology adjuvants, adhesion promoters, pigments, and thermoplastic polymers.

The compositions according to the present invention can additionally contain finely particulate thermoplastic polymer powders. These should have a glass transition temperature in the range between −80° C. and 50° C. Examples of suitable thermoplastic polymers are polypropylene, polyethylene, thermoplastic polyurethanes, (meth)acrylate copolymers, styrene copolymers, polyvinyl chloride, polyvinyl acetal, and polyvinyl acetate and copolymers thereof, in particular ethylene-vinyl acetate (EVA). Although the particle size and particle size distribution of the thermoplastic polymer powder are not particularly critical, the average particle size should be less than 1 mm, by preference less than 350 μm, particularly preferably between 100 and 20 μm. If thermoplastic polymer powders are additionally used, their proportion in the total formulation is between 1 and 20 wt %, by preference between 5 and 15 wt %.

The fillers can be selected from a plurality of materials; to be recited here in particular are chalks, natural or ground calcium carbonates, calcium magnesium carbonates, silicates, talc, barite, and carbon black. It may optionally be useful for at least a portion of the fillers to be surface-pretreated; in the case of the various calcium carbonates or chalks in particular, a coating with stearic acid has proven useful in order to decrease entrained moisture and decrease the moisture sensitivity of the cured composition. The compositions according to the present invention can additionally contain between 0 and 8 wt %, by preference between 1 and 6 wt %, calcium oxide. The total proportion of fillers in the formulation can vary between 10 and 80 wt %; the preferred range is between 20 and 65 wt %.

Conventional stabilizers or aging protection agents can be used to prevent thermal, thermooxidative, or ozone-related breakdown of the compositions according to the present invention, for example sterically hindered phenols (for example, 2,2-methylene-bis(4-methyl-6-tert.-butylphenol)) or amine derivatives; typical quantitative ranges for these stabilizers are 0 to 2 wt %.

Although the rheology of the compositions according to the present invention can also be brought into the desired range by selecting the fillers and by way of the quantitative ratio of the low-molecular-weight liquid rubbers, conventional rheology adjuvants such as, for example, pyrogenic silicic acids, bentones, or fibrillated or pulp short fibers in the range between 0.1 and 7%, or also hydrogenated castor oil derivatives—known e.g. by the trade name Rilanit (Cognis)—can be added. Further conventional adjuvants and additives can additionally be utilized in the compositions according to the present invention.

All common blowing agents can, in principle, be used to achieve foaming during the curing process, although organic blowing agents from the class of the azo compounds, N-nitroso compounds, sulfonyl hydrazides, or sulfonyl semicarbazides are preferred. Examples that may be cited of the azo compounds to be used according to the present invention are azobisisobutyronitrile, and in particular azodicarbonamide; from the class of the nitroso compounds, dinitrosopentamethylenetetramine may be named; from the class of the sulfohydrazides, 4,4'-oxybis(benzenesulfonic acid hydrazide), diphenylsulfone-3,3'-disulfohydrazide or benzene-1,3-disulfohydrazide; and from the class of the semicarbazides, p-toluenesulfonyl semicarbazide.

The aforesaid blowing agents can also be replaced by so-called expandable microspheres, i.e. non-expanded thermoplastic polymer powders, that are impregnated or filled with low-boiling organic liquids. Microspheres of this kind are described, for example, in EP-A-559254, EP-A-586541, or EP-A-594598. Although not preferred, microspheres that have already been expanded can also be used or additionally used. If applicable, these expandable/expanded microspheres can be combined in any quantitative ratio with the aforesaid "chemical" blowing agents. The chemical blowing agents are utilized in foamable compositions at quantities between 0.1 and 3 wt %, by preference between 0.2 and 2 wt %, and the microspheres between 0.1 and 4 wt %, by preference between 0.2 and 2 wt %.

Although the compositions according to the present invention usually already have very good adhesion to the substrates because of the preferred content of liquid rubber having functional groups, tackifiers and/or adhesion promoters can be added if necessary. Suitable for this purpose, for example, are hydrocarbon resins, phenol resins, terpene phenol resins, resorcinol resins, or derivatives thereof, modified or unmodified resin acids or esters (abietic acid derivatives), polyamines, polyaminoamides, anhydrides, and anhydride-containing copolymers. The addition of polyepoxy resins in small quantities can also improve adhesion to many substrates. For this, however, the solid epoxy resins having a molecular weight above 700 are then preferably used in finely ground form. If tackifiers or adhesion promoters are used, their nature and quantity depend on the polymer composition and on the substrate onto which the composition is applied. Typical tackifying resins (tackifiers) such as, for example, terpene phenol resins or resin acid derivatives, are used in concentrations between 5 and 20 wt %; typical adhesion promoters, such as polyamines, polyaminoamides, or phenol resins or resorcinol derivatives are used in the range between 0.1 and 10 wt %.

The compositions according to the present invention are by preference free of plasticizers and extender oils. It may, however, be necessary to influence the rheology of the uncured composition and/or the mechanical properties of the cured composition by adding so-called extender oils, i.e. aliphatic, aromatic, or naphthenic oils. This influence is by preference exerted by appropriate selection of the low-molecular-weight liquid rubbers or by the concurrent use of low-molecular-weight polybutenes or polyisobutylenes. If extender oils are used, quantities in the range between 2 and 15 wt % are utilized.

In order to achieve high-strength, impact peel-resistant, and peel-resistant rubber mixtures, the compositions according to the present invention by preference contain (indications in wt %):

|  | General composition | Preferred composition | Particularly preferred composition |
| --- | --- | --- | --- |
| Solid rubber | 0-15% | 0-12% | 0-9.0% |
| Liquid polybutadiene (MW = 5000), (10-20% vinyl-1,2, 50-60% trans-1,4, 25-35% cis-1,4) | 2-50% | 5-42% | 8-36% |
| Polybutadiene having active carboxyl groups (MW = 1000-10,000 g/mol) | 0-25% | 1-15% | 3-10% |
| Sulfur | 4-25% | 5-15% | 7.5-12.5% |
| Accelerator | 0.25-8% | 0.4-6% | 0.5-3.5% |
| Bifunctional vulcanization crosslinker | 0-2% | 0-1% | 0-0.5% |
| Zinc oxide | 0.5-10% | 2-8% | 3-7% |
| Phenol resin | 0-8% | 0-6% | 0-3% |
| Disodium salt of hexamethylene-1,6-bis(thiosulfate) | 0-2.5% | 0.1-1.8% | 0.4-1.3% |

-continued

|  | General composition | Preferred composition | Particularly preferred composition |
|---|---|---|---|
| Antioxidant | 0-2.0% | 0.1-1.0% | 0.2-0.7% |
| Calcium oxide | 0-8% | 1-6% | 2.5-5.5% |
| Carbon black | 0-4% | 0.1-2% | 0.2-1% |
| Calcium carbonate | 10-45% | 15-40% | 25-36% |
| Calcium carbonate, coated | 0-30% | 5-18% | 3-12% |

In addition, as mentioned above, further fillers such as graphite, fibers, talc, silicates, clays, further typical accelerators, crosslinking agents such as peroxides, other antioxidants, co-activators, and further catalysts, blowing agents, oils, and aging protection agents can additionally be used. If applicable, rheology adjuvants, adhesion promoters, pigments, and thermoplastic polymers can also be contained in the composition. The sum of the constituents of the composition adds up in each case to 100%.

The high-temperature-resistant, reactive, single-component adhesives can used, like the hitherto known rubber-based adhesives, in body manufacture, for example for crimped seam adhesive bonds or overlapping adhesive bonds. They can be applied onto oiled panels such as those used in automobile body manufacture, and the components are then joined. As a rule, the compositions according to the present invention do not need any precuring mechanisms, such as an induction heater, body oven, or IR radiator, for precuring, since they are washer-resistant like the hitherto known rubber compositions. They exhibit very much greater elasticity as compared with the hitherto known rubber compositions, and are capable of absorbing high energy in the form of impact peel work or impact peel energy in the adhesive join. In particular, the rubber compositions according to the present invention exhibit very good impact peel properties in the cured state. These properties are desirable so that the structurally adhesively bonded components meet modern automotive safety requirements even in the event of an accident (crash behavior). Because the compositions according to the present invention can be formulated without expensive special polymers or copolymers, they can be produced particularly economically.

The compositions according to the present invention can be manufactured in known fashion in mixing units having a high shear action; these include, for example, kneaders, planetary mixers, internal mixers, so-called Banbury mixers, and similar mixing units known to one skilled in the art.

The exemplifying embodiments that follow are intended to explain the invention further, the selection of the examples not being intended to represent any limitation of the scope of the subject matter of the invention.

EXAMPLES

The adhesive compositions described below were produced by mixing the constituents in a vacuum-capable laboratory kneader.

Example 1

Comparison

| | |
|---|---|
| Polybutadiene cis-1,4 (solid) | 2.80 |
| Calcium oxide | 2.50 |
| 2,2-methylene-bis-(4-methyl-6-tert.-butylphenol) | 0.50 |

-continued

| | |
|---|---|
| Carbon black | 0.50 |
| Zinc oxide | 3.00 |
| Precipitated calcium carbonate | 20.00 |
| Low-molecular-weight polybutadiene oil (MW = 1800), 50% vinyl | 19.00 |
| Low-molecular-weight stereospecific polybutadiene oil [2] | 7.55 |
| Sulfur | 6.50 |
| ZMBT | 2.50 |
| Polybutadiene having active carboxyl groups (MW = 2100) | 10.00 |
| Calcium carbonate, stearate-coated | 15.00 |
| MBTS | 0.95 |
| Disodium salt of hexamethylene-1,6-bis(thiosulfate) | 0.50 |
| Microspheres | 0.20 |
| Polyvinyl acetate-EVA Copolymer, $T_g$ approx. 40° C. | 8.50 |

Example 2

According to the Invention

| | |
|---|---|
| Polybutadiene cis-1,4 (solid) | 2.80 |
| Calcium oxide | 4.20 |
| 2,2-methylene-bis-(4-methyl-6-tert.-butylphenol) | 0.50 |
| Carbon black | 0.50 |
| Zinc oxide | 4.00 |
| Precipitated calcium carbonate | 31.22 |
| Calcium carbonate, stearate-coated | 6.65 |
| Low-molecular-weight polybutadiene oil [1] | 30.58 |
| MBTS | 0.95 |
| Sulfur | 10.00 |
| Bifunctional crosslinker for vulcanization | 0.15 |
| Disodium salt of hexamethylene-1,6-bis(thiosulfate) | 0.95 |
| Phenol resin | 2.50 |
| Polybutadiene having active carboxyl groups (MW = 2100) | 5.00 |

Example 3

According to the Present Invention

| | |
|---|---|
| Polybutadiene cis-1,4 (solid) | 2.80 |
| Calcium oxide | 4.20 |
| 2,2-methylene-bis-(4-methyl-6-tert.-butylphenol) | 0.50 |
| Carbon black | 0.50 |
| Zinc oxide | 4.00 |
| Precipitated calcium carbonate | 29.49 |
| Calcium carbonate, stearate-coated | 6.65 |
| Low-molecular-weight polybutadiene oil [1] | 30.58 |
| MBTS | 1.20 |
| Sulfur | 11.50 |
| Bifunctional crosslinker for vulcanization | 0.15 |
| Disodium salt of hexamethylene-1,6-bis(thiosulfate) | 0.95 |
| Phenol resin | 2.50 |
| Polybutadiene having active carboxyl groups (MW = 2100) | 5.00 |

Example 4

According to the Present Invention

| | |
|---|---|
| Polybutadiene cis-1,4 (solid) | 5.09 |
| Calcium oxide | 4.20 |
| 2,2-methylene-bis-(4-methyl-6-tert.-butylphenol) | 0.50 |
| Carbon black | 0.50 |
| Zinc oxide | 4.00 |

-continued

| | |
|---|---|
| Precipitated calcium carbonate | 31.37 |
| Calcium carbonate, stearate-coated | 6.65 |
| Low-molecular-weight polybutadiene oil [1] | 22.04 |
| MBTS | 1.20 |
| Sulfur | 11.50 |
| Bifunctional crosslinker for vulcanization | 0.15 |
| Disodium salt of hexamethylene-1,6-bis(thiosulfate) | 0.95 |
| Phenol resin | 2.50 |
| Polybutadiene having active carboxyl groups (MW = 2100) | 5.00 |
| Polycyclooctenamer | 5.00 |

Notes:
[1] MW = 5000; microstructure: 10-20% vinyl-1,2, 50-60% trans-1,4, 25-35% cis-1,4 double bonds.
[2] MW = 1800, 50% vinyl double bonds.

Using the rubber compositions of Examples 1 to 4 described above, test articles were fabricated from sheet steel in order to determine tensile shear strength (adhesive join dimensions 25×12.5×0.2 mm) and impact peel energy. To cure the adhesive mixture, the test articles were cured in a recirculating drying oven for 30 minutes at 180° C. The measurement results for tensile shear strength at room temperature and for ISO 11343 impact peel energy at room temperature and at −30° C. are listed in the table below:

| Example | Tensile shear strength (MPa) | Impact peel energy, RT | Impact peel energy, −30° C. |
|---|---|---|---|
| 1 | 16.2 MPa | 3 J | 1.5 J |
| 2 | 16.3 MPa | 29.5 J | 2.0 J |
| 3 | 21.4 MPa | 21.0 J | 3.7 J |
| 4 | 23.2 MPa | 22.5 J | 4.7 J |

It is clearly evident from the tensile shear strengths and impact peel energies in the table above that the adhesive compositions according to the present invention based on liquid rubbers guarantee both higher tensile strengths and considerably higher impact peel energies with respect to comparable rubber compositions of the existing art, in particular at room temperature but also at low temperatures down to −30° C. These higher impact peel energies are an essential criterion for vehicle engineering, since adhesive bonds of this kind can absorb a great deal more energy in the event of an impact load in accidents.

The invention claimed is:

1. A single-component, high-temperature-curing reactive composition comprising:
   a) at least one liquid polyene having a number average molecular weight between 400 and 80,000;
   b) at least one liquid polybutadiene having a polymer chain comprising three structure types in the polymer chain: 10-20% vinyl-1,2, 50-60% trans-1,4, and 25-35% cis-1,4 double bonds as a microstructure; and
   c) a vulcanizing system comprised of sulfur and one or more vulcanization accelerators, or one or more quinone oximes, or sulfur, one or more vulcanization accelerators, and one or more quinone oximes.

2. The single-component, high-temperature-curing reactive composition according to claim 1, additionally comprising at least one solid rubber selected from the group consisting of cis-1,4-polybutadiene, styrene-butadiene rubber, synthetic isoprene rubber, natural rubber, ethylene-propylene-diene rubber (EPDM), polycyclooctenamer, nitrile rubber, butyl rubber, acrylic rubber, and polychloroprene.

3. The single-component, high-temperature-curing reactive composition according to claim 1, wherein the liquid polybutadiene b) has a number average molecular weight between 2,000 and 12,000.

4. The single-component, high-temperature-curing reactive composition according to claim 1, additionally comprising at least one thermoplastic polymer powder.

5. The single-component high-temperature-curing composition according to claim 1, wherein said vulcanizing system is comprised of sulfur, one or more organic vulcanization accelerators, and one or more zinc compounds.

6. The single-component high-temperature-curing composition according to claim 1, wherein the vulcanizing system is comprised of 4 wt % to 25 wt % powdered sulfur, 0.25 wt % to 8 wt % organic vulcanization accelerator(s), and 0.5 wt % to 10 wt % zinc compound(s), the wt % being based on the total composition.

7. The single-component high-temperature-curing composition according to claim 1, wherein the vulcanizing system is additionally comprised of up to 2 wt % of one or more bifunctional vulcanization crosslinkers.

8. The single-component high-temperature-curing composition according to claim 1, wherein the vulcanizing system is additionally comprised of one or more bifunctional dithiocarbamates.

9. The single-component high-temperature-curing composition according to claim 1, additionally comprising at least one additive selected from the group consisting of fillers, rheology adjuvants, extender oils, blowing agents, pigments, adhesion promoters, and aging protection agents.

10. The single-component high-temperature-curing composition according to claim 1, wherein the at least one liquid polyene has a number average molecular weight between 800 and 25,000.

11. The single-component high-temperature-curing composition according to claim 1, wherein the liquid polybutadiene b) has a number average molecular weight between 5,000 and 9,000.

12. The single-component high-temperature-curing composition according to claim 1, comprising at least one polybutadiene having carboxyl groups.

13. The single-component high-temperature-curing composition according to claim 1, wherein the vulcanizing system is comprised of 5 wt % to 15 wt % powdered sulfur, 0.4 wt % to 6 wt % organic vulcanization accelerator(s), and 2 wt % to 8 wt % zinc compound(s), the wt % being based on the total composition.

14. The single-component high-temperature-curing composition according to claim 1, additionally comprising at least one blowing agent.

15. The single-component high-temperature-curing composition according to claim 1, additionally comprising at least one phenol resin.

* * * * *